United States Patent [19]
Schönfeld et al.

[11] 3,836,822
[45] Sept. 17, 1974

[54] CONTROL APPARATUS FOR TEMPORARILY REDUCING TURBINE TORQUE

[75] Inventors: Peter Schönfeld, Essen; Heinz Borgmann, Muhlheim-Ruhr; Gerhard Plohn, Bamberg, all of Germany

[73] Assignee: Kraftwerk Union Aktiengesellschaft, Muhlheim-Ruhr, Germany

[22] Filed: Aug. 30, 1972

[21] Appl. No.: 284,865

[30] Foreign Application Priority Data
Mar. 22, 1972 Germany............................ 2213951

[52] U.S. Cl........................ 317/21, 60/105, 290/40
[51] Int. Cl. ............................................. H02p 9/04
[58] Field of Search .......... 290/40, 40.1, 2; 317/21; 60/105

[56] References Cited
UNITED STATES PATENTS
| | | | |
|---|---|---|---|
| 3,421,014 | 1/1969 | Moorganou | 290/40 |
| 3,427,464 | 2/1969 | Watson | 2/69 |
| 3,609,384 | 9/1971 | Strohmeyer | 290/40 |
| 3,614,457 | 10/1971 | Eggenberger | 290/40 |

Primary Examiner—G. R. Simmons
Attorney, Agent, or Firm—Herbert L. Lerner

[57] ABSTRACT

In the event the load on a generator of a turbo generator is temporarily removed, either partially or completely, the turbine setting or control valves are closed by providing a brief interruption of a power control device until the malfunctioning part of the system is disconnected and power is again called for by the system. This is accomplished by providing control apparatus which is operable in parallel to the power control device and which responds to load jumps exceeding predetermined and adjustable valves to interrupt the power control device and thereby close the turbine setting valves.

13 Claims, 4 Drawing Figures

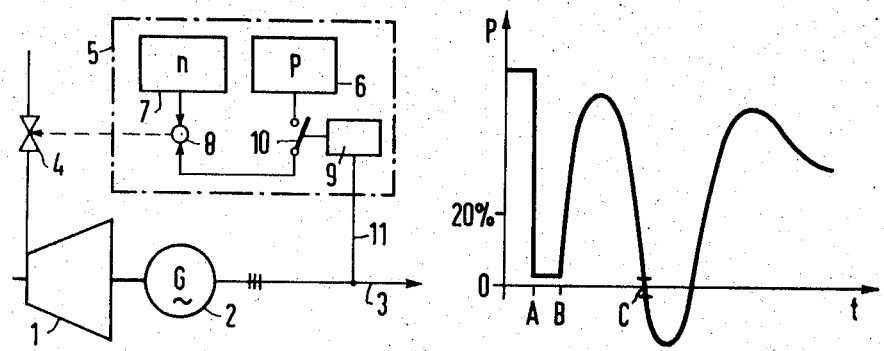
Fig. 1
Fig. 3
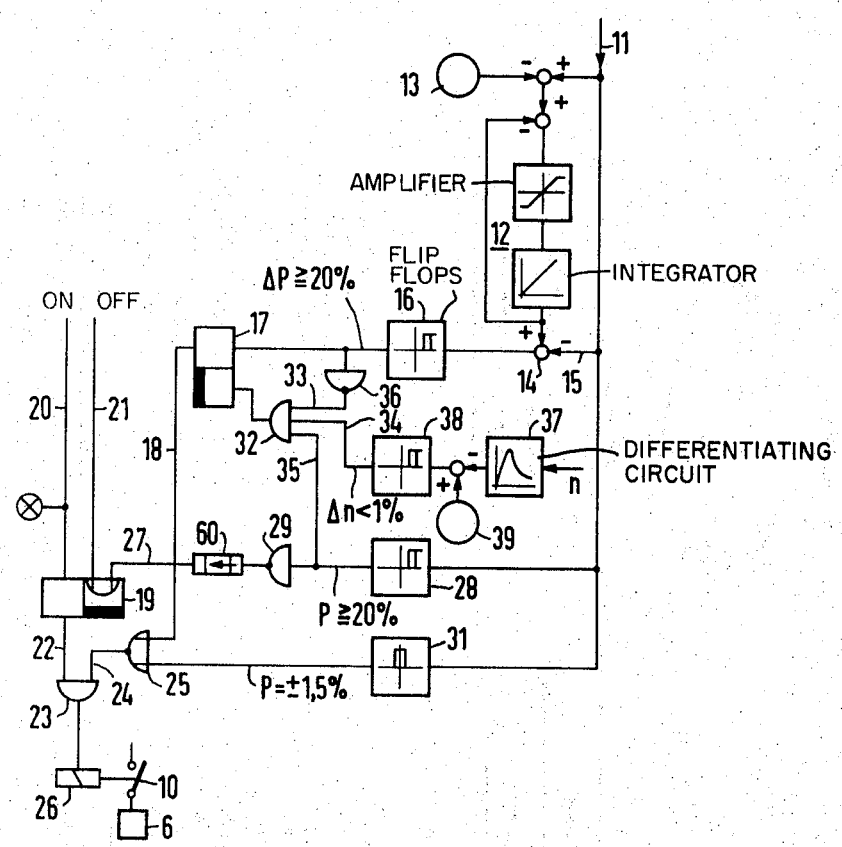
Fig. 2

CONTROL APPARATUS FOR TEMPORARILY REDUCING TURBINE TORQUE

In controlling turbogeneratoes there is generally provided an electrical or electro-hydraulic turbine control which consists essentially of a speed control device and a power control device. Above a defined and predetermined power level, which is generally about 20% of the rated power output, the power control device takes over control of the turbine setting valves by adding an input thereto. In the range below 20% of the rated power output the turbine setting valves are usually controlled by the speed control device alone. In the event that part of the load on the turbogenerator is suddenly removed but which is still at above 20% of the rated power output, which can be caused by short circuits, for example, it has heretofore been customary not to close the turbine setting valves. Also, it is pointed out that it is only by the increased speed of rotation that the power control signal is influenced by the frequency. In the event of a complete load removal followed by immediate loading of the turbogeneraor, the power control device becomes operable and is interrupted or connected, respectively, each time the load drops below 20% during the subsequent transient response. In this connection it is possible that, with the load reduced and the full torque still present, the magnet wheel or rotor angle will be changed to such an extent that the machine will fall out of synchronization. When this occurs the turbogenerator must be synchronized and loaded up again. Such synchronization, however, requires skilled operators and a considerable amount of technical effort and time. This is a disadvantage and particularly so if only a brief load reduction occurs as in the case of a short circuit where the defective part of the system is usually disconnected very fast.

It is therefore an object of the invention to provide a control apparatus which in such cases of temporary, complete or partial removal of the load, it is possible to obtain reduction of the turbine torque for a short period and thereby prevent the machine from accelerating. At the same time the magnet wheel angle of the generator is prevented from becoming excessive so that the generator can remain in the system even in the event that loads are disconnected for short periods of time. Also after the load is removed temporarily full power is again immediately available.

The present invention includes the feature that the control apparatus will respond to load jumps beyond a predetermined and adjustable deviation, such provision being arranged parallel to a power control device for the immediate, short-term interruption of the power control device and the closing of the turbine setting valves. Furthermore, the magnet wheel angle is highly attenuated after the machine load is restored; that is, the magnetic wheel oscillations are favorably influenced. The control apparatus which consitutes part of the electro-hydraulic turbine control depends only on the measured power and can therefore close the turbine setting valves much earlier than the latter would be closed by the power control device itself. Thus the control apparatus interrupts the power control device, which functions with a certain delay, and can then operate again, when the load is reconnected, by reconnecting the power control device without the need for resynchronizing. During the subsequent load hunting the control apparatus does not respond as it is capable of discriminating between actual load jumps and oscillations.

In forming the interrupt signal for the power control device there is provided a first interruption-signal path which includes a fast-acting servo system held at a preset margin relative to the power output. The interruption signal path also includes a summing device for the power signal and the servo signal, where the output signal of the summing device, which is positive in the event of a load jump exceeding a pre-set value, provides the disconnect signal which is fed to a threshold tripping device connected thereto. Due to the fact that discrimination is provided between a load jump and an oscillation, the threshold tripping device carries a positive interrupt signal only for a brief period of time. Accordingly, it is preferable to have a storage device follow the threshold tripping device to hold the interrupt signal in order to interrupt the power control signal for sufficiently long a period until the reconnect criteria are fulfilled.

With control apparatus of the present invention it is also possible to disconnect the power control device if the level falls below a pre-set operating range for the control by providing a disconnect-signal path parallel to the interrupt-signal path and which includes a threshold tripping device which causes a disconnect signal to be produced through an inverter stage and a delay stage when the level drops below the operating range of the power control device.

This operating range of the power control device extends as mentioned above, generally down to 20% of the rated power. However, when the power control device is disconnected with delay at a power level below 20% an additional provision must be made to cover possible dangerous situations. For example, if no negative jump has occurred and the threshold tripping device following the summing member has not responded, but the machine still has full energy at the time of this disconnect action, provision is made to interrupt the power control device immediately and to disconnect it after a delay via the 20% threshold tripping device, if up to that point the power is still below 20%.

For this reason, a further parallel interrupt-signal path is provided with a threshold tripping device which responds in case of a complete removal of the load at a pre-set margin from zero power. In a preferred embodiment of the invention the interrupt signals of the first and the second interrupt-signal paths are brought together at an inverting OR gate in the control apparatus.

It is also preferred to provide a second storage device for setting the manually entered connect and disconnect commands for the power control device as the latter is primarily switched on only by hand. For switching off the power control device, there is provided between this second storage device and a disconnect relay an AND gate having a signal input from the second storage device and a further signal input from the previously mentioned inverting OR gate.

In order to release the power control device again after a brief interruption, several conditions must be fulfilled which signal power delivery. As the interrupt signal of the first interrupt-signal path is stored in a storage device, in order to clear the first storage device, an AND gate is provided with at least two signal-carrying inputs. The first input is connected via an inverter stage to the load-jump threshold tripping device and the second input is connected to the threshold tripping device for adjusting the operating range of the power control device. In addition, a third input can be provided which is connected to a threshold tripping device which carries a signal if the speed gradient falls below a pre-set value. However, alternatively it is also possible to provide a pure time delay stage instead of determining the speed gradient. For this purpose the second signal input of the AND gate is connected to an OR gate having two inputs one of which is connected to the power threshold tripping device and the other to a delay member connected to the first interrupt-signal path following the first storage device.

The design and operation of embodiments of the invention will now be described in more detail with the aid of the attached schematic drawings, wherein:

FIG. 1 is a block diagram of an overall circuit in which the present invention is used.

FIG. 2 is a block diagram of the control apparatus according to one embodiment of the invention.

FIG. 3 is a diagram showing the operation of the control apparatus.

Figure 4:
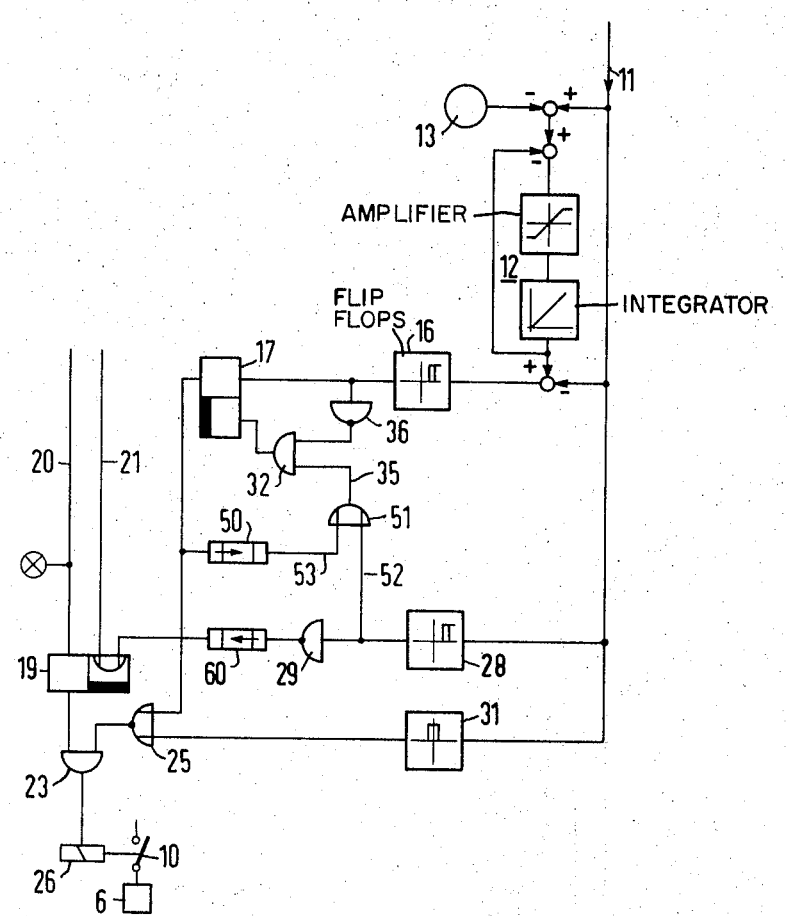
FIG. 4 is a block diagram of a control apparatus according to an alternate embodiment.

Referring to the drawings, there is shown in FIG. 1 a turbogenerator which includes a turbine 1, generator 2, three-phase transmission line 3, and turbine control or setting valves 4. The turbine setting valves 4 are controlled by an electrohydraulic turbine control unit 5. The turbine control unit 5 is essentially comprised of a power control device 6 and a speed control device 7, the signals of the two control devices 6 and 7 being added in a summing device 8 which acts upon an operating control element (not shown in detail) of the turbine setting valves 4. The speed control device 7 takes over control at about 20% of the control range while the remaining 80% is regulated by the power control device 6. According to the invention, a very rapidly functioning control device 9 is provided. The power values delivered by the generator 2 are fed directly to the control device 9 by means of a measuring line 11. The control device 9 acts on a switch 10 of the power control device 6 such that in the event of sudden drops in the load, the control device 9 can temporarily interrupt or switch off the power control device 6. It will be seen, therefore, that the control signals from the control device 9 dominate, and the setting valves 4 can thereby be closed temporarily within the operating range of the power control device 6.

FIG. 2 shows a block diagram of the control apparatus according to one embodiment of the invention. In FIG. 2 the power measurement or generator output values are fed to the control apparatus by means of the line 11. The control apparatus comprises a servo system 12 having an amplifier and an integrator, the arrangement being such that the desired margin or ratio of the servo system 12 relative to the respective power output level can be adjusted by means of a setting device 13. In order to make is possible for the control apparatus to respond to relatively small power jumps for example 20% power jumps over the entire power range, it is necessary to make the response threshold of the control apparatus follow at a distance of 20% of the operating power. This means that when increasing the power, the servo system 12 is made to follow the actual operating power at the desired distance, so that the sum signal at the summing point 14 of the actual power fed in via lines 15 and the servo signal obtained from the servo system 12 results in a negative value as the signs indicate. If now a drop in the load of at least 20% occurs, a positive signal is obtained at the summing point 14, so that a succeeding threshold tripping device 16 responds and transmits a trigger signal "Interrupt Power Control" to the switch 10 of the power control device 6. Since, however, the value of the servo system 12 follows the amount of the power jump that has taken place very rapidly, the threshold tripping device 16 carries trigger signal for only a very short time. In order to obtain the trigger time required for the switch 10 to release, it is necessary to have the threshold tripping device 16 followed further by a storage device 17 in which the signal is held until a clear signal appears as will hereinafter be described. Device 16 may be a flip-flop threshold tripping device as shown as component 157, FIG. 27, of U.S. Pat. No. 3,421,014.

This rapid servo action is necessary in order to prevent false responses of the control apparatus, for instance, in the case of a power oscillation after a brief interruption, thereby making it possible to discriminate reliably between an oscillation and an actual power jump.

The power control device 6 is normally switched on manually when the turbo-generator set is put into operation. For this reason a second storage device 19 comprising two inputs 20 and 21 for the manual commands "On" and "Off" is provided in the control apparatus. From this storage device 19 an output 22 leads to an AND gate 23. The previously described disconnect signal is introduced into the second input 24 of the AND gate 23 via the disconnect-signal path 18 and an inverting OR gate or inverting stage 25. As a result of the fact that the input 22 of the AND gate 23 carries an L-signal after the power control device 6 is switched on manually and, for a disconnect signal, an O-signal is present at the input 24 via the disconnect path 18 through the preceeding inverter stage 25, the coil 26 of the switch 10 will therefore not be supplied with current and an interruption of the power control device 6 is effected.

In electro-hydraulic turbine control devices of the type herein being considered it is customary that the power control device takes over the control of the turbine setting valves only for power values of 20% of rated power or more. For this reason there is further provided in the control apparatus, according to one embodiment of the present invention, a disconnect signal path 27 with a threshold tripping device 28, which carries no signal when the power drops to below 20% of rated power, so that a signal is present through an inverter stage 29 at the "Off" input 21 of the storage device 19 and in such a case the switch 10 is also switched off. Since in a normal operational decrease of power to below 20%, a slight amount of power hunting about the 20% level could occur, it is advisable to further provide in the above described disconnectsignal line a delay member 60 which provides for disconnection of the power control device 6 only after a predetermined time. Device 28 may be a flip-flop threshold tripping device as shown as component 157, FIG. 27, of U.S. Pat. No. 3,421,014.

However, since the power control device 6 is disconnected at power outputs below 20% with a delay of about 1.5 seconds, provision must also be made to interrupt the control immediately in the event of danger. In order to illustrate such a possibility, an applicable power curve is shown in FIG. 3. It is assumed that at point A a sudden drop in the load took place which was reliably controlled by the servo system 12 and led to an interruption of the power control device 6. After reconnecting the power and after the power rise following point B, the power control device 6 is activated again. In the case of subsequent oscillation, which is neither picked up by the servo system 12, by the previously described time delay of 1.5 sec., nor by the signal 27 of the threshold tripping device 28 provision must be made to disconnect the power control device 6 immediately if the load is completely removed but the full steam energy is still stored in the machine, for example, if the load during the transient response is less than 20%. In order to be able to also control this extreme case, a third parallel interrupt-signal path 30 is provided which comprises a power threshold tripping device 31.

The threshold tripping device 31 is adjusted to a power range of ±1.5%, corresponding to the range C of the diagram in FIG. 3. When this power range of ±1.5% is reached, the switch 10 is thereby also opened by the threshold tripping device 31 and the turbine setting valves 4 are briefly closed. Device 31 may be a flip-flop threshold tripping device as shown as component 157, FIG. 27, of U.S. Pat. No. 3,421,014.

The threshold limiting device 31, however, responds not only in the case of complete load removal but also if during transient responses after a load jump the power traverses or reaches the set power range of ±1.5%. As the disconnect times occurring with these oscillations are small, the overall control is not impaired.

In the initially described first interrupt-signal path 18, the interrupt signal is stored in storage device 17. In order to release the power control device 6 again after reconnecting the power, this storage device 17 must be cleared and to do this, several conditions must be fulfilled. For this purpose the reset input of the storage device 17 is preceded by an AND gate 32 with three inputs 33, 34 and 35. The three conditions which are required for resetting the storage device 17, are as follows. First, no release signal must be present at the threshold tripping device 16 of the servo system 12. If this condition is fulfilled, an L-signal is present at the input 33 via an inverter stage 36 following the threshold tripping device 16. Secondly, the power must be above 20% which is the operating range of the power control device 6 so that the threshold limiting device 28 carries a signal and an L-signal is present at the input 35. As the third condition there is introduced, in the example of the embodiment shown in FIG. 2, a speed gradient by means of a differentiating member 37 and a threshold limiting device 38. Device 37 is a differentiating circuit, for instance, as shown by member $dw/dt$ at the input of branch C in FIG. 5 of U.S. Pat. No. 3,421,014. Device 38 may be a flip-flop threshold tripping device as shown as component 157, FIG. 27, of U.S. Pat. No. 3,421,014. With the introduction of the speed gradient it is also possible to initiate resetting of the storage device 17 by the speed signal in addition to by the power signal. This has the advantage that in the event the load is removed from the turbine, the reset signal can be formed depending on the magnitude of the change or jump corresponding to the increase in the speed of rotation without impairing the functioning or operability if a new disconnect situation should occur. In general, an L-signal is present at the input 34 of the AND gate 32 if the speed gradient is smaller than 1% of the maximum possible value. This value is adjustable by a setting device 39.

If therefore all three conditions are fulfilled, the AND gate 32 carries a signal and the storage device is reset so that an O-signal is present at the inverter stage 25 via the interrupt-signal path 18, and an L-signal is present again at the input 24 of the AND gate 23, whereby the switch 10 is closed and the power control device 6 can again take over control.

FIG. 4 shows an alternative circuit similar to that of FIG. 2. However, in this alternate embodiment the introduction of a speed gradient as the clearing signal for the storage device 17 is dispensed with. Instead, only a simple time delay 50 is provided. The input 35 of the AND gate 32 is connected to an OR gate 51 which has one input 52 from the threshold limiting device 28 and a second input establishing a connection with the first interrupt signal path 18 through a time delay 50. The storage device 17 can thereby be cleared again after an adjustable interruption time of the power control device 6 or if the power exceeds 20%.

With the above described control apparatus it is thus possible to improve the dynamic stability of the system. Accordingly in the event of a short-circuit close to the generator, the turbine setting valves 4, are closed and subsequently opened again during the period of time when the transmission line is disconnected for correcting the short circuit, so that the turbogenerator can remain in the system. The particular advantage of this control apparatus consists of the fact that the closing command for the turbine setting valves 4 does not depend on the pressure in the intermediate heater and the position of the power circuit breaker, but only on the instantaneously changing power. Accordingly the closing command can be given without delay, and specifically, throughout the entire power range of the turbogenerator in the event of partial or complete load removal. In the case of possible power hunting, for instance, after the power control is re-connected, no release signal is given.

In this circuit arrangement, the command to open the turbine setting valves 4 is independent of any permanently set time of a relay and a second interrogation of the power circuit breaker, but depends only on the state of the machine permissible at the time, that is, on the speed gradient and the actual output value. The arrangement thereby makes it impossible to reopen the setting valves 4 at the wrong time.

While the invention has been described by means of specific examples and embodiments, it is not to be limited thereto for various modifications will occur to those skilled in the art without departing from the spirit and scope of the invention.

We claim:

1. Control apparatus for temporarily reducing turbine torque by closing turbine setting valves in the event the load on the turbogenerator is temporarily removed partially or completely, comprising electro-hydraulic control means for controlling said turbine setting valves, said electro-hydraulic control means including a power control device operable to control said turbine setting valves, a first threshold tripping device for determining the lower threshold of the operating range of said power control device, a first input signal means for said control device providing a signal when a load jump exceeds a preset value, a second input signal means for said control device providing a signal at a pre-set value from zero power in the event of complete load removal, said turbine setting valves being closed by disconnecting said power control device when said first input signal means produces its signal or when said second input signal means produces its signal, said first and second input signal means being operable as aforesaid when said first threshold tripping device exceeds the lower threshold of the operating range of said power control device, a third signal producing means producing a signal upon occurrence of a predetermined event, said power control device being operable to open said setting valves only upon the absence of any signal produced by any of said first, second and third signal producing means.

2. Apparatus according to claim 1 wherein said first input signal means produces a disconnect signal for said power control device along a first disconnect signal path, said first input signal means comprising a fast-acting servo system held at a predetermined margin relative to the power output, a summing device for said power output and for the servo signal, and a second threshold tripping device, said summing device having an output signal which is positive when a load jump exceeds a pre-set value to thereby provide a disconnect signal via said second threshold tripping device.

3. Apparatus according to claim 2 wherein said second threshold tripping device is followed by a first storage device for holding said disconnect signal.

4. Apparatus according to claim 3 wherein said second input signal means comprises means defining a second disconnect-signal path parallel to said first disconnect-signal path, said second path including said first threshold tripping device, an inverter stage, and a delay member, said first threshold tripping device providing a disconnect signal when the power output falls below the level of the operating range of said power control device.

5. Apparatus according to claim 4 wherein said third signal producing means comprises means defining a third parallel disconnect-signal path having a third threshold tripping device, said latter device responding at a pre-set value from zero power in the event of complete load removal.

6. Apparatus according to claim 4 comprising an inverting OR gate, the signals of said first and third disconnect signal paths being fed to said inverting OR gate.

7. Apparatus according to claim 6 comprising a disconnect coil for operating the disconnect of said power control device, said disconnect coil being preceeded by a second storage device for setting manually entered connect and disconnect commands.

8. Apparatus according to claim 7 comprising an AND gate between said second storage device and said disconnect coil, said AND gate having one signal input from said second storage device and another signal input from said inverting OR gate.

9. Apparatus according to claim 7 wherein said second storage device has a manual disconnect-signal terminal, said second disconnect signal path being connected to said terminal.

10. Apparatus according to claim 4 comprising an AND gate in said first disconnect-signal path preceeding said first storage device for clearing the latter, the last said AND gate having at least two signal-carrying inputs, one input being connected via an inverter stage to said second threshold tripping device; the other of said signal-carrying inputs being connected to said first threshold tripping device for setting the operating range of said power control device.

11. Apparatus according to claim 10 wherein said AND gate has a third input connected to a fourth threshold tripping device, said latter device carrying a signal if the gradient of speed rotation falls below a pre-set value.

12. Apparatus according to claim 10 wherein said second signal input of said AND gate is connected to an OR gate, said OR gate having two inputs one of which is connected to said first threshold tripping device and the other of which is connected to a time delay means, said latter means being connected to said first disconnect-signal path behind said first storage device.

13. Apparatus according to claim 1 comprising a magnetic valve for releasing the pressure in a secondary circuit, a load-jump relay for triggering said magnetic valve, an AND gate for suppressing said load-jump relay when said power control device is reconnected, said AND gate having one input from a switch on said power control device and another input from the signal path of said load-jump relay, said AND gate operating a switch in said signal path of said load-jump relay for operating said switch.

* * * * *